(12) United States Patent
Dworatzek et al.

(10) Patent No.: US 7,017,563 B2
(45) Date of Patent: Mar. 28, 2006

(54) VALVE FOR CONTROLLING A FLUID FLOW

(75) Inventors: Klemens Dworatzek, Edingen (DE); Karlheinz Muenkel, Oberderdingen-Flehingen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 134 days.

(21) Appl. No.: 10/619,553

(22) Filed: Jul. 16, 2003

(65) Prior Publication Data

US 2004/0217042 A1 Nov. 4, 2004

(51) Int. Cl.
*F02M 37/04* (2006.01)

(52) U.S. Cl. .................. 123/574; 137/543; 137/543.13

(58) Field of Classification Search ........ 123/572–574, 123/41.86, 514; 137/541, 543, 543.13, 907
See application file for complete search history.

(56) References Cited

U.S. PATENT DOCUMENTS

| | | | | |
|---|---|---|---|---|
| 2,853,986 A | * | 9/1958 | Kolbe | 123/574 |
| 3,645,242 A | * | 2/1972 | Horiuchi | 123/574 |
| 4,294,281 A | * | 10/1981 | Gerdes | 137/541 |
| 4,765,364 A | * | 8/1988 | Arcari | 137/536 |
| 5,137,050 A | * | 8/1992 | Clarke et al. | 137/541 |
| 5,579,744 A | * | 12/1996 | Trefz | 123/573 |
| 5,697,349 A | * | 12/1997 | Blum | 123/572 |
| 5,697,351 A | * | 12/1997 | Schumacher | 123/574 |
| 5,975,061 A | * | 11/1999 | Briggs et al. | 123/514 |
| 6,422,224 B1 | * | 7/2002 | Walker, Jr. | 123/572 |
| 6,579,448 B1 | | 6/2003 | Dworatzek | |
| 6,601,565 B1 | * | 8/2003 | Tofan-Petre | 123/457 |
| 6,792,925 B1 | * | 9/2004 | Dworatzek et al. | 123/573 |

FOREIGN PATENT DOCUMENTS

| | | |
|---|---|---|
| DE | 19605426 A1 | 8/1997 |
| DE | 19805426 A1 | 8/1997 |
| DE | 20004431 U1 | 7/2000 |
| DE | 199 49564 | 4/2001 |
| DE | 29959564 A1 | 4/2001 |

* cited by examiner

*Primary Examiner*—Marguerite McMahon
(74) *Attorney, Agent, or Firm*—Crowell & Moring LLP

(57) ABSTRACT

A valve for controlling a fluid flow, in particular for crankcase venting of an internal combustion engine, including a base body (37), a valve body (22) and a biasing means (23), the base body (37) having a valve side (45) and an opposite side (46) situated opposite the valve side (45), a part of the valve body (22) protruding through an opening (47) situated in the base body (37), the biasing means (28), in particular a compression spring, being arranged between the opposite side (46) of the base body (37) and the valve body (22) and supported against the opposite side of the base body (37).

2 Claims, 5 Drawing Sheets

VALVE FOR CONTROLLING A FLUID FLOW

BACKGROUND OF THE INVENTION

The present invention relates to a valve for controlling a fluid flow comprising a base body, a valve body and a biasing means, particularly a valve for regulating a flow of crankcase gases from an internal combustion engine crankcase vent, and to a filter device comprising a flow regulating valve of the aforementioned type.

Examples of valves of this type are disclosed in published German Patent Application No. DE 199 49 564 A1; in German Patent No. DE 196 05 426 C2, and in German Utility Model No. DE 200 04 431 U1. In each case the actual valve always comprises at least four parts, namely a base body and a valve body, each correspondingly designed to achieve a sealing effect, a biasing element and a support for this biasing element. Thus, it is always necessary to provide support by a supporting structure independently of the valve. In a simple case, this may require only a supporting dome, but in a more complex case it requires supporting brackets, which present the least possible obstacle to flow. This makes the manufacturing process complex and expensive.

SUMMARY OF THE INVENTION

The object of the invention is to provide an improved valve having a simple design.

Another object of the invention is to provide a valve which can be used universally.

A further object of the invention is to provide a valve which takes up very little space.

An additional object of the invention is to provide a valve which is relatively inexpensive to manufacture.

It is also an object of the invention to provide a valve which can be used as a pressure regulating valve or as a straight-way valve.

These and other objects are achieved in accordance with the present invention by providing a valve for controlling a fluid flow comprising a base body, a valve body, and a biasing means, said base body having a valve side and an opposite side situated opposite said valve side, wherein a part of the valve body protrudes through an opening in the base body, and the biasing means is disposed between the opposite side of the base body and the valve body and is supported against said opposite side of the base body.

Advantageous further refinements and preferred embodiments are additionally described in detail hereinafter.

The valves of the invention are preferably used in filter systems used for filtering a stream of gas or liquid, e.g., crankcase vents or oil modules in internal combustion engines. However, they may also conceivably be used in any other devices in which control valves or opening valves and/or overflow valves are used to control and/or regulate fluid flow.

The valve of the present invention includes a base body, which is preferably constructed radially and disk-shaped and has an integrated valve body guide and through openings, This base body, which connects the valve to the particular housing in which the valve is installed, may have any basic shape, i.e., it may be angular, spherical or cylindrical. The valve body guide integrated into the base body is preferably designed as a radial hollow cylinder to securely guide the valve body on the inside and/or outside wall surface and to prevent tilting of the valve body. Likewise, however, this guide may comprise a plurality of cylinders or it may have an angular base area. The opening integrated into the base body should allow a fluid to pass through while also allowing one or more parts of the valve body to protrude through the base body. The shape of the opening is freely selectable and may be chosen individually. In a preferred case there are multiple openings in the form of sectors of circles to allow the fluid passage and for protrusion of parts of the valve body, which serve to accommodate the biasing means, and also a radial through opening to accommodate a guide dome for the valve body.

The valve body may be designed in the shape of a ball, a cylinder, a plate or a cone, or it may have some other shape known from the state of the art. First, it must achieve a mating seal with the base body, and second, it must offer a possibility of accommodating a biasing means. The valve body is preferably designed as a circular plate having portions which protrude through the base body for accommodating the biasing means. The biasing means is a resilient element, which may be designed, e.g., as a block spring, a coil or helical spring, a rubber band or as a resilient plastic foam. A helical spring is preferred to achieve an axial force which is uniformly distributed radially and to make it possible to obtain different spring characteristic curves with springs having the same outside dimensions. However, any resilient elements known in art may conceivably be used. Likewise, compression springs are preferable to tension springs because they offer advantages in terms of the technical design and economics.

Through a corresponding combination of base body, valve body and tension or biasing element, a releasable sealing connection is achieved between the valve body and the valve side of the base body facing the valve body. For this purpose, a part of the valve body extends through an opening in the base body, which may have any desired shape, and provides a seat for accommodating the biasing means, which is consequently supported between the side of the base body facing away from the valve body and the part of the valve body protruding through the base body. In an advantageous embodiment of this invention, this seat or support on the valve body is provided by an abutment, in particular a snap hook. However, simple hooks, notches, a bore with a pin and other accommodation possibilities known in the state of the art are also conceivable. In the basic state, the biasing means is supported between the base body and the valve body and thus reverses the induction of force of the holding force known in the state of the art, so the valve is pulled closed instead of being pushed to close it. If a sufficient force counter to the direction of force exerted by the biasing element is exerted on the valve body because of a pressure difference which overcomes the force of the biasing element, the valve body will be lifted up from the base body, thereby opening the valve, which is closed in the basic state. For sealing, sealing means such as sealing rings or the like may be provided.

Due to this design, it is possible on the one hand for the valve to be used universally, regardless of the presence of a support on the housing side, thus simplifying production of the housing, while on the other hand, the manufacturing cost and the manufacturing complexity of the valve are extremely low. In an ideal case, this valve may consist of two simple parts. This means minimizing the design down to what is essential without any loss of function. Likewise, this results in a much smaller space requirement than is the case with traditional valves according to the state of the art, and traditional systems based on tension springs can be replaced easily by the system presented above.

According to one advantageous embodiment of this invention, the valve body includes a guide dome which extends through the base body through the corresponding valve body guide and thus prevents a radial displacement in relation to the base body or tilting of the valve body so that a reliable seal is ensured. This guide dome may be designed as a cylindrical pin, a hollow cylinder or intersecting webs, and many embodiments known from the state of the art may be used. Likewise, a plurality of guide domes may be arranged in a distributed configuration. However, the guide dome must be designed to correspond to the design of the valve body guide.

According to another embodiment of this invention, the valve guide of the base body may be designed with a possibility of controlled adjustment of the combination of the biasing means with the valve body and the base body and thus the valve characteristic. Thus, valves having essentially the same design may have completely different characteristics. Due to the varying opening times, this results in different flow volumes and an altered opening and/or closing behavior of the valve. In the case of a valve with a soft setting, a lower pressure difference is sufficient for opening the valve; likewise, the valve then also closes later and thus permits a greater volume flow between the opening and closing of the valve. When there is an increase in the holding force, i.e., when the valve setting becomes harder, the valve opens only at a greater pressure difference and it doses sooner. The targeted adjustment may be continuous or occur in stages, and thus any desired valve characteristic can be achieved in a controlled manner. The advantage results from the possibility of adapting valves having the same construction to different pressure situations, which possibly change during operation, and using these similarly constructed valves in different devices.

In yet another advantageous embodiment, the adjustment described above can be carried out by adjusting the abutment. This preferably refers to an axial adjustment with a thread on the valve guide of the base body, for example, and a nut, which increases or decreases the load on the biasing means. Likewise, spacers, designed for example as disks, arranged on the side of the base body which contacts the biasing means or on the valve body may accomplish this adjustment. As an alternative, a locking or clamping means may also be provided to alter the characteristic curve of the biasing means. With an appropriate design, such adjustment options could preferably be accomplished without the use of tools so that, if necessary, the spring curve can be adjusted regardless of location or the availability of tools.

Likewise, in another embodiment, the valve characteristic, namely the opening and/or closing pressure, can be changed by a simple and quick replacement of the biasing means. To do so, the biasing means is removed from the valve guide of the valve body and then a replacement biasing means having a different spring characteristic is inserted. In a modification of this design, this replacement can be accomplished without the use of tools, with the biasing means being supported by snap hooks in the valve guide of the valve body and these snap hooks being elastically compressible by hand to release the biasing means. Because of the permanent resilient elasticity of the snap hooks, the new biasing means, preferably a helical spring, can also be introduced again permanently. However, other tool-less replacement options, e.g., a wing nut, which represents the abutment and is secured via an end stop or similar solutions known from the state of the art, are also conceivable.

In advantageous embodiments, the valve body and/or the base body is made of materials suitable for injection molding. Preferred materials here include, e.g., polyamide [nylon], which is characterized by a good thermal stability, strength and a certain resistance to corrosive media. The temperatures normally prevailing in a crankcase vent or an oil module are approximately in a range between a starting temperature of approx. −20° C. up to an operating temperature of approx. 130° C. Due to the simple design of the valve part, the injection mold can be produced readily, which has a positive effect on the overall cost of the valve. The valve material can thus be adapted to the particular requirements of the installation situation. A simple and nevertheless secure seal between the valve seat and the valve body can be achieved in this way by integrally molding the sealing means on the valve body or on the base body, in particular by the two-component injection molding technique with polyamide, for example, as the base component and a thermoplastic elastomer as the soft, seal-forming component. A preferred seal is an annular gasket. However, a sealing bead or some other sealable embodiment known from the state of the art may also be used.

In another embodiment, the biasing means, preferably a plastic compression spring or a resilient elastomer block is injection molded directly onto the base body, in addition to the sealing means. This yields an advantageous valve which consists of only two elements and is thus simple to manufacture and easy and universal in use.

In another advantageous embodiment, a clamping device associated with the valve is provided, which acts upon the valve body in at least one of its two end positions with a clamping force which is exerted transversely to the direction of valve body movement. To influence the spring characteristic and the opening and/or closing behavior, the valve may be provided with a clamping device which acts upon the valve body with a clamping force which is exerted in the radial direction transversely to the direction of valve body movement and securely clamps the valve body in the valve body guide. The clamping device includes an additional tension or biasing element, in particular a spring, which is designed in particular as a compression spring. This additional biasing means is connected at both axial ends to locking elements, in particular locking balls, which are urged radially outwardly with a clamping force due to the force of the additional biasing means and are pressed into locking recesses, which are preferably formed in the inside wall of the valve body guide and are advantageously adapted to the shape selected for the locking balls. Likewise, however, friction-locking connections are also conceivable.

The clamping device is in its locked position when the valve is in the closed position, so that a greater pressure difference is necessary for switching the valve to the open position than is the case in embodiments without the clamping device. The level of the additional pressure required for releasing the clamping device and switching the valve to the open position can be influenced through the force of the additional biasing means and through the geometry of the locking elements acted upon by the additional biasing means and the geometry of the locking recesses. After reaching the limiting pressure above which the valve is switched to the open position, the locking elements are first forced inward against the force of the additional biasing means because of the axial adjusting movement of the valve body in the direction of the opening position, and as the opening movement progresses they contact the inside wall of the valve body guide. The clamping force, which is exerted by the clamping device on the inside wall of the valve body guide in the switching section between the closed and open positions is much lower than the clamping force in the closed position of the valve, because in the locked end position, the clamping device assumes a form-fitting locked position, but in the intermediate switching section, it only glides along the inside wall. In addition, it should also be noted that in the resting position of the valve body, initially a greater static friction must be overcome between the locking elements acted upon by the additional spring and the locking recesses, whereas when the valve body is moving, only a slight sliding effect occurs between the locking elements that are urged outward and the inside wall of the valve body guide. This sharp drop in the clamping force changes the total spring characteristic and the opening behavior of the valve. In comparison with embodiments from the state of the art, the valve body can be switched from the closed position to the open position at a higher switching speed. An abrupt switch to the open position is possible with this valve.

Likewise, another clamping device is also conceivable, having a design corresponding to that of the first clamping device and including a second additional biasing element and axial locking elements acted upon by the second additional biasing element. The locking elements engage in locking recesses which are preferably formed in the inside wall of the valve body guide. In this way, the valve body is in a locked position in both its closed position and its open position, from which it can be switched to the opposite end position only by applying an increased force in comparison with embodiments without the clamping devices. As a result, a desired movement characteristic may be imparted to the valve, which can lead to abrupt opening and/or closing of the valve.

The valve described above in various embodiments may be used in a filter device, in particular in a crankcase vent having a filter housing and a cover, with at least one inlet and at least one outlet, the inlet and outlet being separated by a filter element sealingly mounted in the housing. The inlet and outlet may be arranged in any manner in the cover or in the filter housing. The housing preferably has a cylindrical shape, but it may also be designed in any desired shape. Crankcase vents are preferably used in internal combustion engines, regardless of whether stationary or moving. In addition, they may be used wherever the pressure in a pressure space (such as a crankcase) is to be kept within a pressure range, and fluid from that space, e.g., a gas-oil mixture, is to be purified and/or separated. In the case of an internal combustion engine, the pressure in the crankcase should always be in the partial vacuum range from approximately −5 mbar to approximately. −15 mbar relative to atmospheric pressure. This negative pressure is needed to exhaust the so-called blow-by gases formed in the combustion process, which go past the piston rings into the crankcase, and not allow any gas to enter the combustion chamber in the opposite direction. In rare cases, the pressure range may vary between approximately −5 mbar and approximately +5 mbar relative to atmospheric pressure. These values are achieved, for example, when the crankcase is connected directly to the atmosphere, but this is neither desirable or allowed for environmental protection reasons. Crankcase gases are drawn by the crankcase vent out of the crankcase, because a relative partial vacuum prevails within the crankcase vent with respect to the crankcase. The oil-laden gases, which are withdrawn from the crankcase, are purified as they pass through the filter element and their oil content is separated.

If, because of some adverse circumstance, an excess pressure should prevail in the filter housing upstream from the filter element, it can be vented to the atmosphere through a pressure relief valve. Oil which collects in the filter element can be recycled back to the crankcase through a bypass valve integrated into the filter element and a separate oil drain. An outlet on the clean side of the filter system is connected to the air intake line of the engine and is subjected to a relative partial vacuum, which fluctuates greatly. These pressure fluctuations can be compensated by a pressure regulating valve connected between the clean side of the filter and the outlet to prevent any excessive pressure difference from breaking through to the crankcase.

These three valves, which differ in function, can be implemented by embodiments of the simplest valve. These embodiments also allow very great volume flows of more than 1000 L/min, such as those required in industrial motors, for example, without requiring as much installation space as valves known from the state of the art.

One advantageous construction of this filter device includes a pressure regulating valve, in which embodiments of the valve described above are supplemented with a roller diaphragm, preferably on the outer radial end of the valve body end disk, which separates a control pressure space from a passage through which the fluid flow regulated by the valve flows. The control side, which is preferably situated on the outside of the housing, is accordingly connected to a control pressure, preferably atmospheric pressure, whereas on the side through which the fluid flows, the pressure difference of the flowing fluid prevails, here preferably the pressure difference between the clean side and the intake manifold pressure. This roller diaphragm, which unrolls to maintain a seal between the valve body and a housing wall as the valve body moves preferably axially, has the advantage that it exerts virtually no force on the valve body and nevertheless makes it possible for the valve body to move along a longer path to control larger volume flows while at the same time taking up only a very small amount of space. The valve characteristic is achieved mainly through the biasing means and can thus be influenced in a controlled manner through the embodiments mentioned above.

In a preferred embodiment of the filter device, the biasing means of the pressure regulating valve is mounted on the control side of the valve. This in turn produces the simple possibility of maintaining and adjusting the valve characteristic utilizing the possibilities described above for adjusting the biasing means, because in preferred embodiments, the control side is accommodated on the outside of the housing, which thus permits good accessibility.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
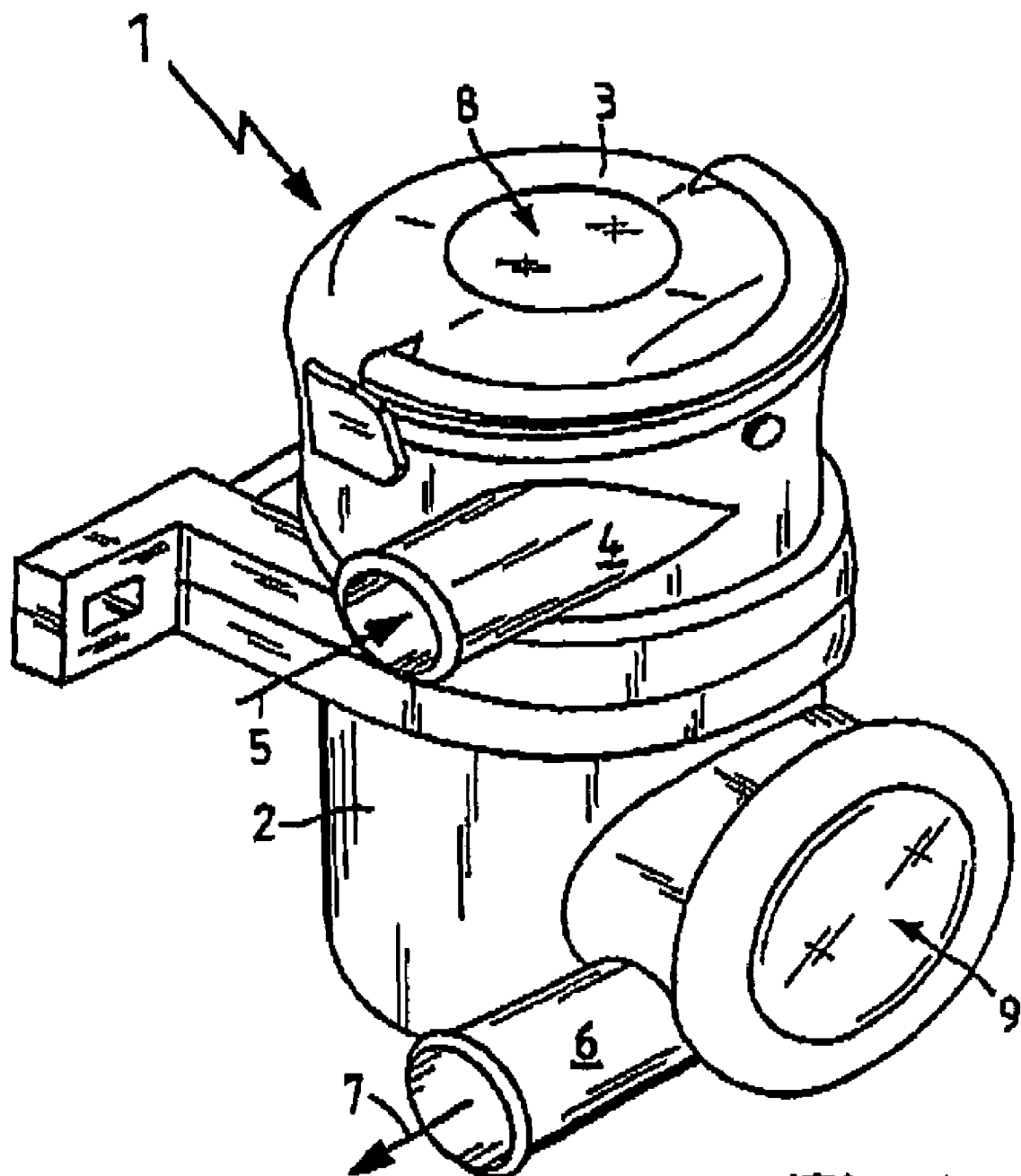
FIG. 1 is a perspective view of a filter device having a pressure relief valve arranged in the housing cover.

The filter device 1 shown in FIG. 1 has a filter element, through which a medium that is to be purified flows, disposed in a generally cylindrical housing 2, which is closed by a removable housing cover 3. The medium to be purified can be introduced into the interior of the filter device in the direction of the arrow 5 through an inlet 4 situated on the side of the filter housing 2. After the medium is purified by passage through the filter element, it is discharged in the direction of the arrow 7 through an outlet 6 also situated on the side of the housing. The medium to be purified may be gaseous or liquid.

According to one preferred embodiment, the filter device 1 is designed as an oil separator in which oil droplets are separated from an oil-air mixture, these droplets being formed, e.g., in the crankcase of an internal combustion engine. The air discharged from the crankcase is purified by filtration and then sent in particular to an intake tract of the internal combustion engine. However, an application in a gas filter or a liquid filter may also be considered.

Figure 2:
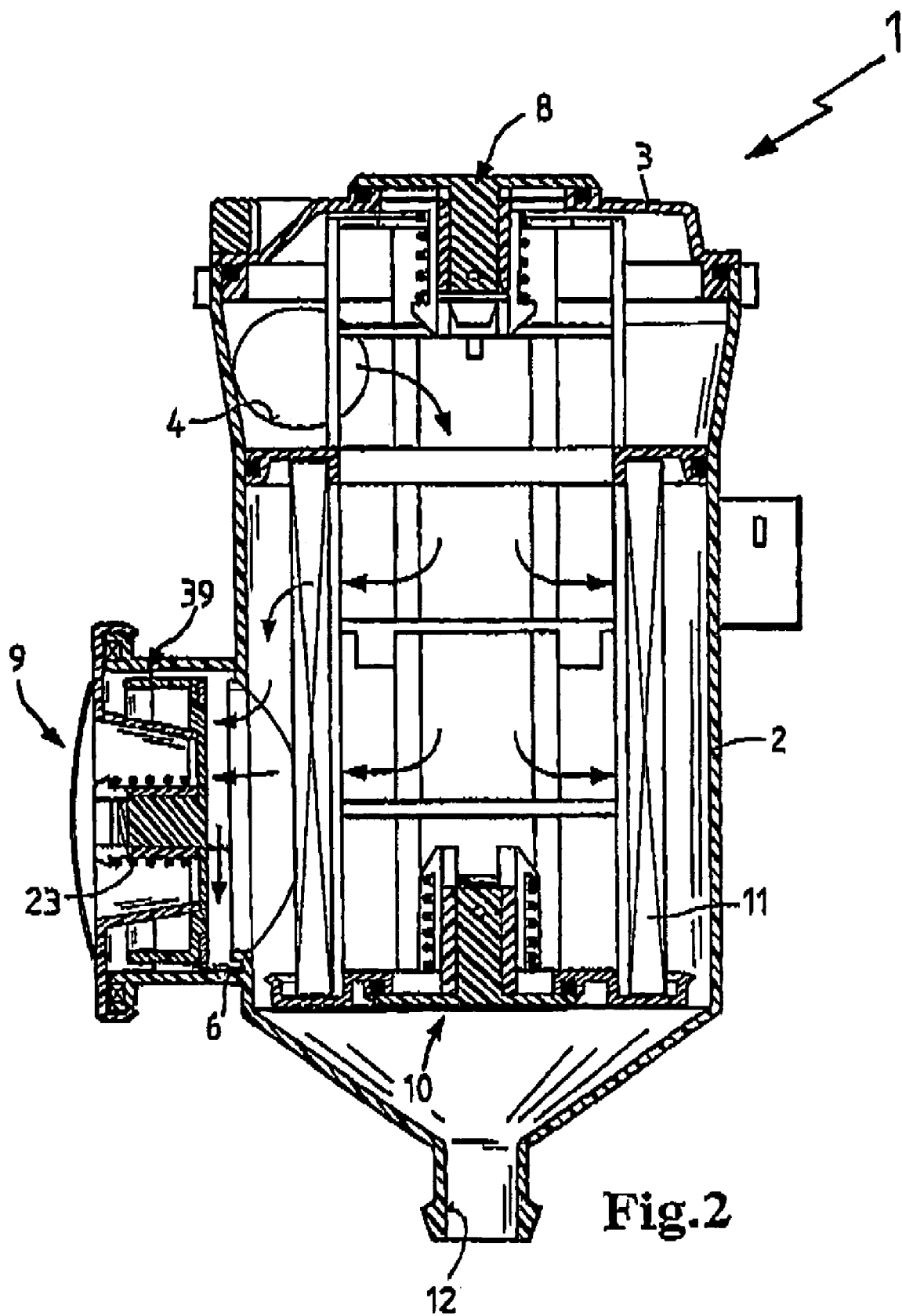
FIG. 2 is a longitudinal sectional view of the filter device of FIG. 1.

As shown in FIG. 1 in combination with FIG. 2, a pressure relief valve 8 is integrated into the housing cover 3, which is situated in the area of an axial end face of the filter housing 2. This pressure relief valve is acted upon by the pressure on the inlet or unfiltered side of the filter element and is moved into its open position if an allowed limiting pressure is exceeded, so that the medium introduced on the unfiltered side can exit the filter housing and an overload is prevented.

On the clean side of the filter device, there is a pressure regulating valve 9 in the area of the outlet channel 6 to prevent an excessive partial vacuum from developing in the crankcase. A relatively low partial vacuum must always prevail here, varying within a very narrow pressure range. If there is a very high partial vacuum on the intake manifold side, it will propagate against the direction of outflow 7 through the pressure regulating valve 9, which is open in the normal case, and against the direction of inflow 5 into the crankcase. The pressure regulating valve 9 is in the open position when a relative partial vacuum within the desired pressure range prevails on the clean side relative to the outside of the filter device 2. This is achieved by a presetting of the pressure regulating valve 9 by appropriate selection or adjustment of the valve spring 23. However, if the relative partial vacuum with respect to the pressure on the outside of the alter device 2 exceeds the initial tension force of the valve spring 23 acting against this pressure, then the pressure regulating valve 9 is moved into its closed position.

As also shown by the sectional diagram according to FIG. 2, the medium to be purified is introduced through the inlet 4 into the interior of the filter housing 2 in which there is a cylindrical filter element 11 whose radial inside forms the unfiltered side and through which the fluid to be purified flows radially from the inside to the outside. In the case of a separator, the separated oil droplets are diverted downward along the radial inside of the filter element 11. The purified air passes radially through the filter element from the inside to the outside, is collected in an annular space radially surrounding the filter element 11 and is conducted to the outside after passing through the pressure regulating valve 9.

A certain quantity of oil collects in the interior of the filter element 11 due to influx and deflection as well as expansion and changes in velocity of the fluid flow. In the normal case, this oil collected in the interior is gradually drawn through the filter element 11 from the unfiltered side to the clean side due to the pressure difference. In the event of a blockage of the filter element 11 or an accumulation of too much oil, there is a bypass valve 10 in the bottom area of the interior of the filter element 11, which is switched to its open position when a minimum pressure is exceeded, whereupon the droplets of separated oil are discharged toward the bottom through a conically tapered area of the filter housing 2 as well as an outlet 12.

Figure 3:
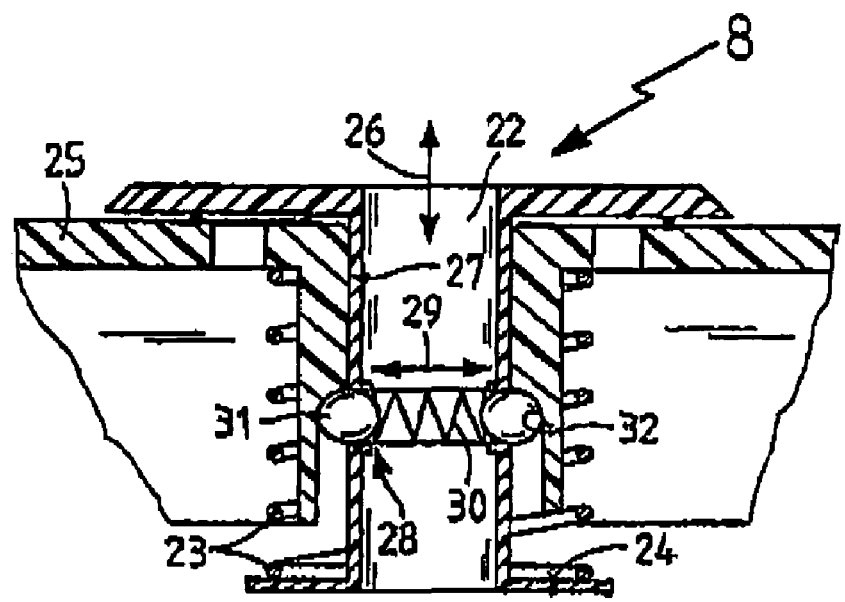
FIG. 3 is a schematic diagram of a pressure relief valve having a valve body which is acted upon by a clamping device exerting a clamping force which acts transversely to the direction of displacement of the valve body.

FIG. 3 shows a specific embodiment of a pressure relief valve 8. This pressure relief valve 8 has a valve body 22, which is movable axially in a valve body guide 27 in the direction indicated by arrow 26 between the closed position illustrated in FIG. 5 and a raised open position. The valve body guide 27 is designed in a housing part 25. The valve body 22 is urged toward its closed position by a valve spring 23, which is supported on a valve plate 24 that is fixedly connected to the valve body 22. If an excess pressure which exceeds the closing force of the valve spring 28 develops in the interior of the housing, the valve body 22 will be moved to its open position so that the excess pressure can escape.

To influence the spring characteristic and the opening and/or closing behavior, the pressure relief valve 8 is provided with a clamping device 28 which acts upon the valve body 22 with a clamping force which is exerted in the radial direction indicated by arrow 29 transversely to the direction of movement indicated by arrow 26 and securely clamps the valve body 22 in the valve body guide 27. The clamping device 28 is fixedly connected to the valve body 22 and includes an additional spring 30, which is designed in particular as a compression spring and whose spring action acts in the direction of arrow 29. At both its axial end faces, the additional spring 80 is connected to locking balls 31, which are subjected to a clamping force due to the force of the additional spring acting radially outward and are urged into locking recesses 32, which are formed in the inside wall of the valve body guide 27 and are advantageously adapted to the shape of the locking balls 31. The clamping device 28 is in its locked position when the valve body 22 is in the closed position, so that a higher excess pressure is necessary for switching the pressure relief valve 8 to the open position than is the case with embodiments without the clamping device 28. The amount of the additional pressure required for releasing the clamping device 28 and switching the valve to the open position can be influenced by the force of the additional spring 30 and the geometry of the locking elements on which the additional spring acts and the geometry of the locking recesses.

After reaching the limiting pressure above which the valve is switched to the open position, the locking balls 31 are first forced inward against the force of the additional spring 30 because of the axial adjusting movement of the valve body toward the open position, and as the opening movement progresses, they contact the inside wall of the valve body guide 27. The clamping force which is exerted against the inside wall of the valve body guide by the clamping device in the intermediate switching section between the closed position and the open position is much lower than the clamping force in the closed position of the valve, because in the closed position, the clamping device assumes a form-fitting locked position, but in the intermediate switching section, it merely slides along the inside wall. In addition, it should be taken into account that in the resting position of the valve body, a higher static friction must first be overcome between the locking elements which are urged by the additional spring into the locking recesses, whereas during movement of the valve body, only a lower sliding effect is operative between the locking elements that are urged outward and the inside wall of the valve body guide.

This sharp drop in the clamping force alters the overall spring characteristic and the opening response of the valve. The valve body can be switched from the closed position to the open position at a higher switching speed in comparison with embodiments known from the state of the art. Thus, the valve can be switched abruptly to the open position.

Figure 4:
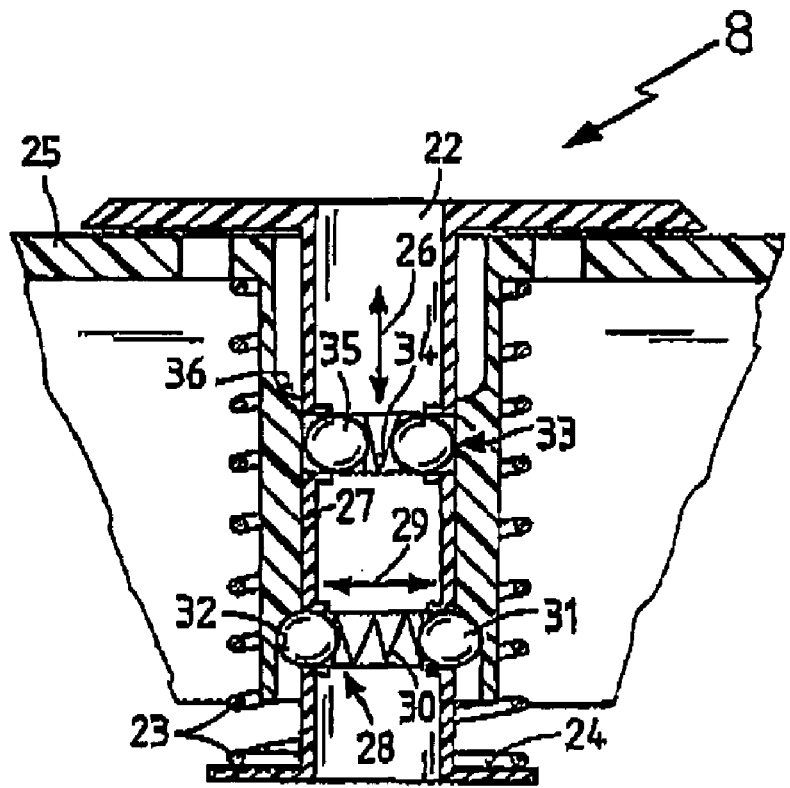
FIG. 4 shows a modified pressure relief valve embodiment with two separately designed clamping devices which exert a clamping force on the valve body of the pressure relief valve in both its closed position and in its open position.

Again in the illustrative embodiment according to FIG. 4, a pressure relief valve 8 is shown, which is in its closed position and is moved axially in the direction indicated by arrow 26 between the closed position and the open position. Like the valve in the preceding illustrative embodiment, this valve has a clamping device 28 which acts upon the valve body 22 in the closed position with a clamping force exerted in the direction indicated by arrow 29 transversely to the direction of valve body movement indicated by arrow 26. In addition, a second clamping device 33 is provided, having a design corresponding to that of the first clamping device 28 and also including another additional spring 34 and anal locking balls 85 acted upon by the second additional spring 34. In the open position of the valve, the locking balls 36 engage in locking recesses 36 which are formed in the inside wall of the valve body guide 27. In this way, in both the closed position and the open position, the valve body 22 is in a locked position from which it can be switched to the respective opposite end position only by applying a high force in comparison with embodiments without clamping devices. The closing movement of the valve is supported here by the force of the valve spring 23. As soon as the excess pressure in the interior of the housing exceeds a limiting value, the force of the valve spring is sufficient to move the valve body 22 axially toward its closed position against the remaining excess pressure in the interior of the housing and against the clamping force of the second clamping device 33. Like the opening movement, abrupt closing of the valve can be achieved with the help of the second clamping device 33, because the clamping force is reduced abruptly as soon as the locking balls 35 of the second clamping device 33 have been lifted out of their seats in the locking recesses 36.

Figure 5:
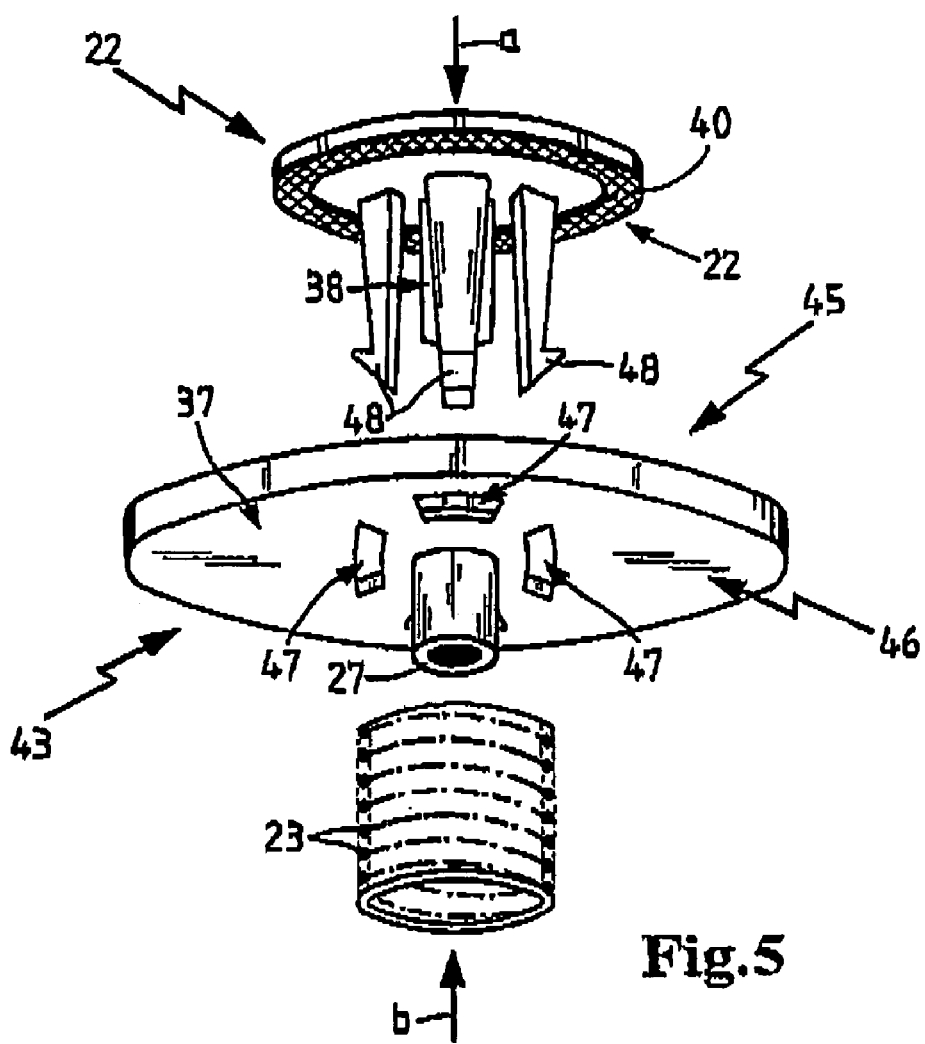
FIG. 5 is a perspective view of a simplified valve embodiment having an integrated gasket and a compression spring as a biasing element.

FIG. 5 shows an exploded perspective view of a simplest valve 43 which may be used as a pressure relief valve 8, a pressure regulating valve 9 or a bypass valve 10. Valve 43 comprises a cylindrical, essentially plate-shaped base body 37 which includes a valve body guide 27 for accommodating a guide dome 38 on the cylindrical essentially plate-shaped valve body 22. The base body has a valve side 45, which has a sealing function, and an opposite side 46. In addition, the valve body 22 has an abutment 48 arranged radially around the guide dome 38. Accurate centering of the valve body 22 is ensured by an accurate fit between the guide dome 38 and the valve body guide 27. The seal between the valve body 22 and the base body 37 is provided here by an annular gasket 40, which is integrated into the valve body 22 and is in sealing contact with the base body 37 when the valve is closed. The abutment 48 is divided into a plurality of parts in order to be able to penetrate through the base body 37 through the existing openings 47 and to a form a support for the biasing means 23, in particular a helical spring. The components 22 and 23 are assembled in the direction of arrows "a" and "b" shown in FIG. 5.

Figure 6:
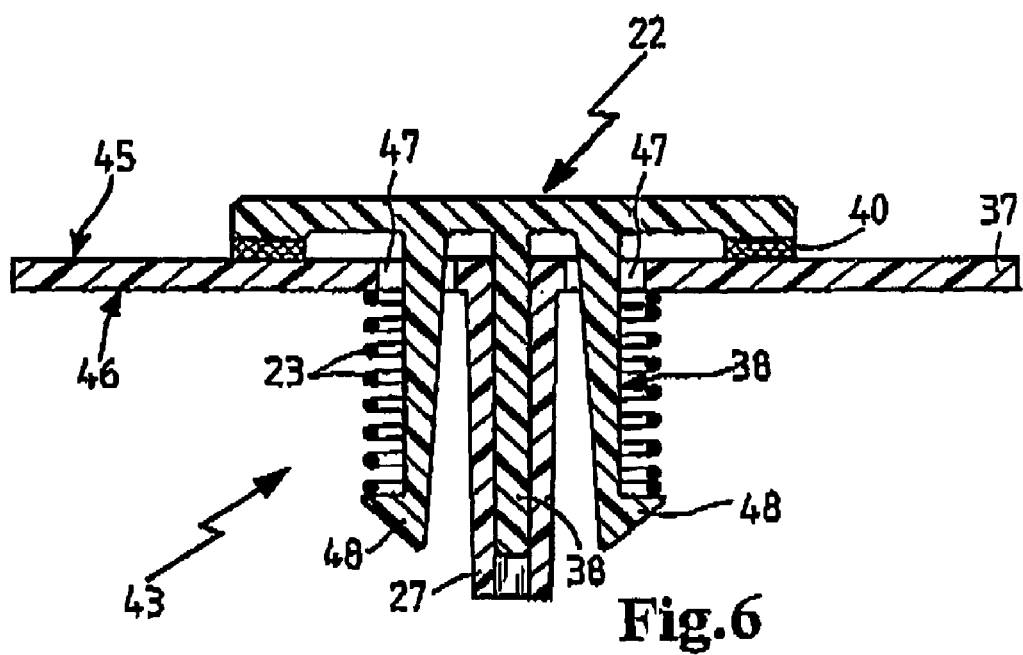
FIG. 6 is a schematic view of the simplified valve embodiment of FIG. 5.

FIG. 6 shows a schematic view of a simplest valve 48 in the installed state. The parts corresponding to those in FIG. 5 are identified by the same reference numerals. As can be seen from FIG. 6 in combination with FIG. 5, the biasing means 23 exerts a compressive force on the base side 46 of the base body and thus pulls the valve body 22 toward the biasing means and against the valve side 45 of the base body 37, thereby forming a seal. This is a reversal of the traditional principle in which the valve body is pressed against the base body. In the open state the biasing means 23 is compressed against the opposite side 46 by an applied minimum pressure difference, the sealing means 40 is lifted up from the valve side 45 thereby enabling a fluid flow through the openings 47.

It can be seen here that this simplest valve can execute a valve function with very few simple parts without requiring an opposed support surface, which is otherwise conventional, in the area of the installation housing. This yields not only a positive cost factor on the valve side but also greatly simplifies the design and manufacture of the installation housing.

Figure 7:
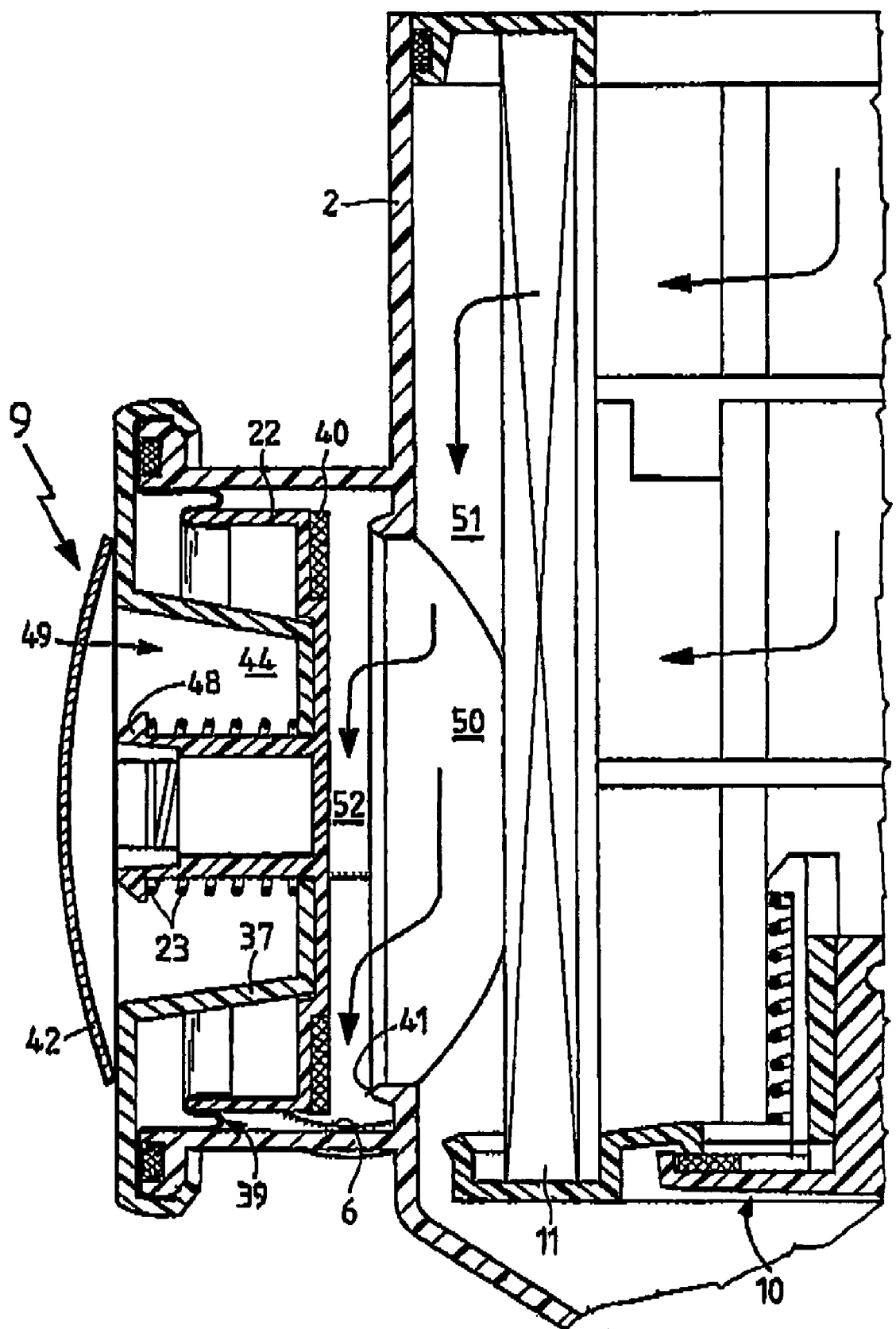
FIG. 7 is a structural diagram of a pressure regulating valve having a roller diaphragm in an open position, indicating the direction of flow and the parts of interest on the housing.

FIG. 7 shows an embodiment of the simplest valve 43 as a pressure regulating valve 9 in an enlarged detail view corresponding to a portion of FIG. 2 in the open position. Parts corresponding to those in FIG. 2 are identified by the same reference numerals. The gases to be purified flow radially through the filter element 11 from the inside to the outside and when the pressure regulating valve 9 is open, the purified gases are supplied to the intake air again through an outlet channel 6. The pressure is regulated based on the difference between the pressure in the outside chamber 44, which is situated in the outer area of the housing on the side which is at atmospheric pressure and through which the gases do not flow and which represents the control side 49 here, and the pressure in the clean gas area on the flow-through side 50 downstream from the filter element 11. The two areas are separated by a roller diaphragm 39, which is connected to the valve body 22 and allows the valve body 22 to move along a path in the spring direction and while exerting virtually no force on the overall system. The adaptation of the pressure regulating valve 9 to the required pressure difference is accomplished by appropriate selection or adjustment of the spring force of the valve spring 23. If the pressure difference is too great, i.e., if the intake manifold vacuum is too great, the pressure regulating valve 9 closes the path from the clean gas side to the outlet chapel 6 by lifting the valve body 22 from the base body 37 and pressing the gasket 40 on the valve body 22 against a separating collar 41. This separating collar 41 has essentially a radial construction and ensures a plane of separation between a clean side 51 and an outlet side 52, both in the area of the through-flow side 50. In this way, the outlet channel 6 is closed. As soon as the pressure difference drops again and the counteracting spring force of the valve spring 23 is large enough, the valve body 22 is released from the separating collar 41 and fluid is again able to flow through the path from the clean side 51 to the outlet side 52. The desired triggering pressure difference can be adjusted by varying the spring force. On the basis of one embodiment of the pressure regulating inventive valve, this change in the spring force can be accomplished easily from the outside of the housing. To do so, the protective cover 42 which is situated above the outside pressure chamber 44 can be removed without the use of tools, releasing the abutment 48 together with the clamped valve spring 23. By simple radial compression of the snap hooks, which form the abutment 48, the valve spring 23 can be removed and replaced with another spring having a different characteristic. Likewise an adjustment by varying the axial length of the space in which the spring is compressed and the resulting change in spring force is also conceivable.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter device for purifying a fluid stream comprising a filter housing having an inlet, an outlet, a filter element in said housing sealingly separating the inlet from the outlet, a housing cover, and a pressure relief valve for releasing excess pressure from within said housing, wherein said valve comprising a base body, a valve body, and a biasing means, said base body comprising a valve side and an opposite side situated opposite said the valve side, wherein a part of the valve body protrudes through an opening in the base body, and the biasing means is disposed between the opposite side of the base body and the valve body and supported against said opposite side of the base body, and wherein said valve has a roller diaphragm situated on one side to form a seal with the valve body and on an opposite side to form a seal between the base body and a housing part, said roller diaphragm sealingly separating a control side of said valve from a flow-through side; said control side being connected to an ambient pressure, and said flow-through side being connected to an interior volume of the housing through which the fluid stream flows.

2. A filter device according to claim 1, wherein the biasing means is arranged on the control side of the valve.

* * * * *

UNITED STATES PATENT AND TRADEMARK OFFICE
CERTIFICATE OF CORRECTION

| | | |
|---|---|---|
| PATENT NO. | : 7,017,563 B2 | |
| APPLICATION NO. | : 10/619553 | |
| DATED | : March 28, 2006 | |
| INVENTOR(S) | : Klemens Dworatzek et al. | |

It is certified that error appears in the above-identified patent and that said Letters Patent is hereby corrected as shown below:

On Title Page, col. 1 Item (30) should read,
Foreign Application Priority Data:

(30) July 16, 2002  (DE)   102 32 045.4

Signed and Sealed this

Fifth Day of September, 2006

JON W. DUDAS
*Director of the United States Patent and Trademark Office*